United States Patent
Frank (10) Patent No.: US 6,682,009 B1
(45) Date of Patent: Jan. 27, 2004

(54) FOUR-POINT SEAT BELT HAVING CENTRAL LOAD LIMITER

(75) Inventor: Matthew C. Frank, Rochester Hills, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 10/228,812

(22) Filed: Aug. 27, 2002

(51) Int. Cl.⁷ .............................................. B65H 75/48
(52) U.S. Cl. ................................................. 242/379.1
(58) Field of Search ......................... 242/378.4, 379.1; 280/805, 806; 297/472, 478

(56) References Cited

U.S. PATENT DOCUMENTS

| | | | |
|---|---|---|---|
| 2,825,581 A | * 3/1958 | Knight | 280/806 |
| 2,899,146 A | * 8/1959 | Barecki | 242/378.4 |
| 3,241,883 A | * 3/1966 | Fontaine | 280/807 |
| 5,398,997 A | * 3/1995 | McFalls | 280/807 |
| 5,503,461 A | 4/1996 | Schreier | |
| 5,526,996 A | 6/1996 | Ebner et al. | |
| 5,560,565 A | * 10/1996 | Merrick et al. | 242/378.4 |
| 5,611,603 A | * 3/1997 | Gray et al. | 242/378.4 |
| 5,704,684 A | * 1/1998 | Dukatz et al. | |
| 5,738,293 A | * 4/1998 | Fohl | 242/379.1 |
| 6,076,894 A | 6/2000 | Busch | |
| 6,206,315 B1 | 3/2001 | Wier | |
| 6,244,965 B1 | 6/2001 | Klecker et al. | |
| 6,360,980 B1 | 3/2002 | Lee | |

FOREIGN PATENT DOCUMENTS

| | | |
|---|---|---|
| DE | 7626542 | 12/1977 |
| DE | 3838789 A1 | 5/1990 |
| DE | 19505448 A1 | 8/1996 |
| EP | 0383473 A | 8/1990 |

\* cited by examiner

*Primary Examiner*—William A. Rivera
(74) *Attorney, Agent, or Firm*—Tarolli, Sundheim, Covell & Tummino L.L.P.

(57) ABSTRACT

An apparatus (10) for helping to protect a vehicle occupant (12) includes first and second lengths of belt webbing (30, 32) for extending over the occupant. First and second spools (62, 80) are supported for rotation in a belt retraction direction (68) and an opposite belt withdrawal direction (70). The apparatus (10) includes a mechanism (90) for blocking rotation of the spools (62, 80) in the belt withdrawal direction (68) until a predetermined force is applied to the spools, and for permitting rotation of the spools in the belt withdrawal direction when a force above the predetermined force is applied to the spools. The mechanism (90) drivingly interconnects the spools and permits rotation of one of the spools (62, 80) in the belt withdrawal direction (70) after blocking rotation in the belt withdrawal direction without causing rotation of the other spool in the belt withdrawal direction.

19 Claims, 7 Drawing Sheets

FOUR-POINT SEAT BELT HAVING CENTRAL LOAD LIMITER

BACKGROUND OF THE INVENTION

1. Technical Field

The present invention relates to an apparatus for helping to protect a vehicle occupant during a crash condition. More particularly, the present invention relates to a vehicle seat belt system having a load limiter.

2. Description of the Prior Art

U.S. Pat. No. 6,076,894 discloses a seat belt system having two shoulder belts and two lap belts. Each shoulder belt extends from an associated shoulder belt retractor, which is fixed relative to an upper portion of a vehicle seat, downward to a buckle assembly. Left and right lap belts are also connected with the vehicle seat and through the buckle assembly.

It is known to use a load limiter to limit the load experienced by a vehicle occupant due to a length of belt webbing restraining the occupant in a crash condition. The load limiter may include a deformable torsion bar.

SUMMARY OF THE INVENTION

The present invention relates to an apparatus for helping to protect a vehicle occupant in a vehicle seat. The apparatus comprises a first length of belt webbing for extending over a vehicle occupant and a second length of belt webbing for extending over the vehicle occupant. A first spool is supported for rotation in a belt retraction direction and an opposite belt withdrawal direction, a portion of the first length of belt webbing being wound on the first spool. A second spool is supported for rotation in a belt retraction direction and an opposite belt withdrawal direction, a portion of the second length of belt webbing being wound on the second spool. The apparatus includes a mechanism for blocking rotation of the first and second spools in the belt withdrawal direction until a predetermined force is applied to the first and second spools and for permitting rotation of the first and second spools in the belt withdrawal direction when a force above the predetermined force is applied to the first and second spools. The mechanism drivingly interconnects the first and second spools and permits rotation of one of the first and second spools in the belt withdrawal direction after blocking rotation in the belt withdrawal direction without causing rotation of the other spool in the belt withdrawal direction.

In one embodiment, the mechanism includes a load limiter for reducing the maximum load experienced by the vehicle occupant through the first and second lengths of belt webbing, a first actuatable one way clutch connected between the first spool and the load limiter, and a second actuatable one way clutch connected between the second spool and the load limiter.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
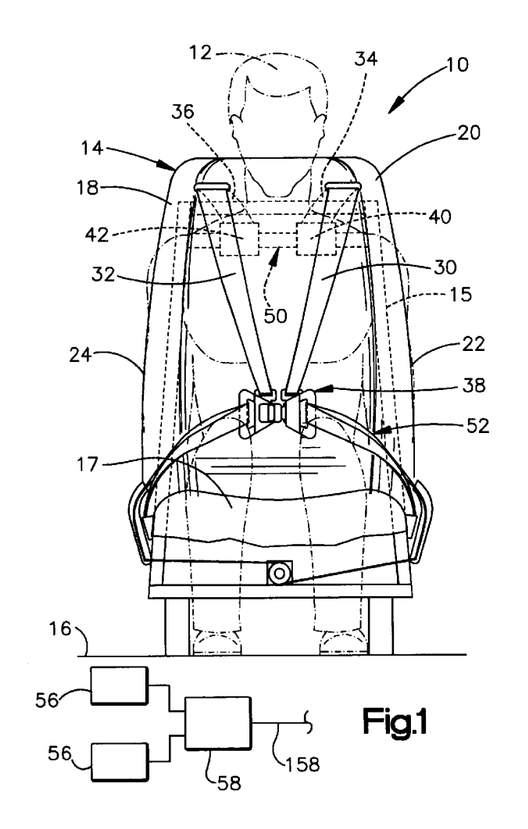
FIG. 1 is a front view of a vehicle seat with a vehicle occupant protection system constructed in accordance with the present invention.
Figure 2:
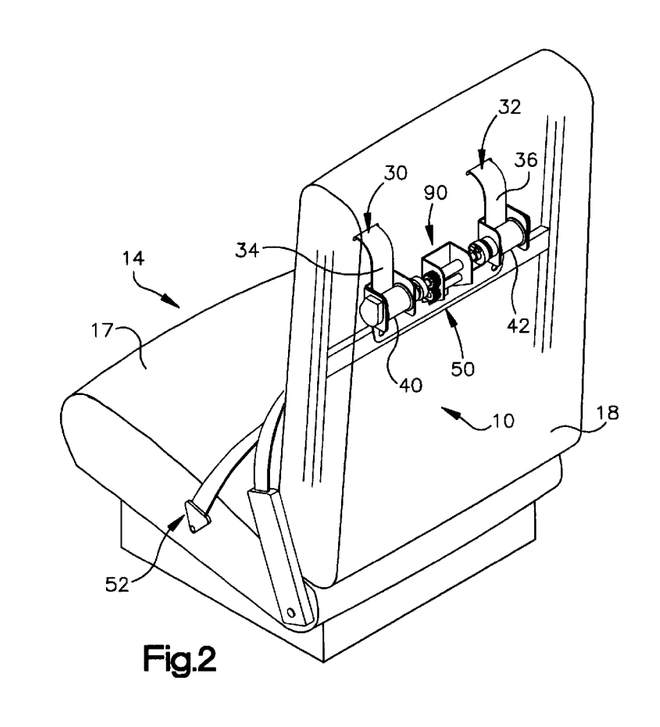
FIG. 2 is a schematic rear perspective view of portions of the vehicle occupant protection system of FIG. 1 illustrating a shoulder belt retractor assembly.

The present invention relates to an apparatus for helping to protect a vehicle occupant during a crash condition. More particularly, the present invention relates to a vehicle seat belt system having a load limiter. The present invention is applicable to various seat belt systems. As representative of the present invention, FIGS. 1 and 2 illustrate a seat belt system 10 for helping to protect a vehicle occupant 12 seated in a vehicle seat 14.

The seat 14 has a frame 15 connected with a floor 16 of a vehicle. The seat 14 has a seat bottom cushion 17 on which the occupant 12 sits, and a backrest 18 that extends upward from the seat bottom cushion 17. The backrest 18 has an upper portion 20 located adjacent the shoulders of the occupant 12. The seat 14 has left and right sides 22 and 24.

Left and right shoulder belts 30 and 32 (FIGS. 1 and 2) extend from the upper portion 20 of the backrest 18 adjacent the shoulders of the occupant 12. The left shoulder belt 30 (FIGS. 1 and 2) is a length of belt webbing that has an end portion 34 connected with a left shoulder belt retractor 40. The right shoulder belt 32 is a length of belt webbing that has an end portion 36 connected with a right shoulder belt retractor 42. The retractors 40 and 42 are part of a shoulder belt retractor assembly 50 (described below in detail) that is secured in the backrest 18 adjacent the shoulders of the occupant 12. The other ends of the shoulder belts 30 and 32 are connected with a buckle assembly 38. The seat belt system 10 also includes a lap belt assembly 52 connected to the seat frame 15 in any manner well known in the art. The lap belt assembly 52 is connectable with the buckle assembly 38 to secure the vehicle occupant 12 in the seat 14.

The vehicle includes one or more crash sensors 56. Each one of the crash sensors 56 senses a vehicle condition indicating the occurrence of a crash condition and outputs an electric signal indicative of the crash condition. In an exemplary embodiment of the invention, at least one of the crash sensors 56 senses vehicle deceleration. The crash sensors 56 are operatively connected with a controller 58. The controller 58 is preferably a microcomputer. The controller 58 receives power from a power source (not shown), such as the vehicle battery.

Figure 3:
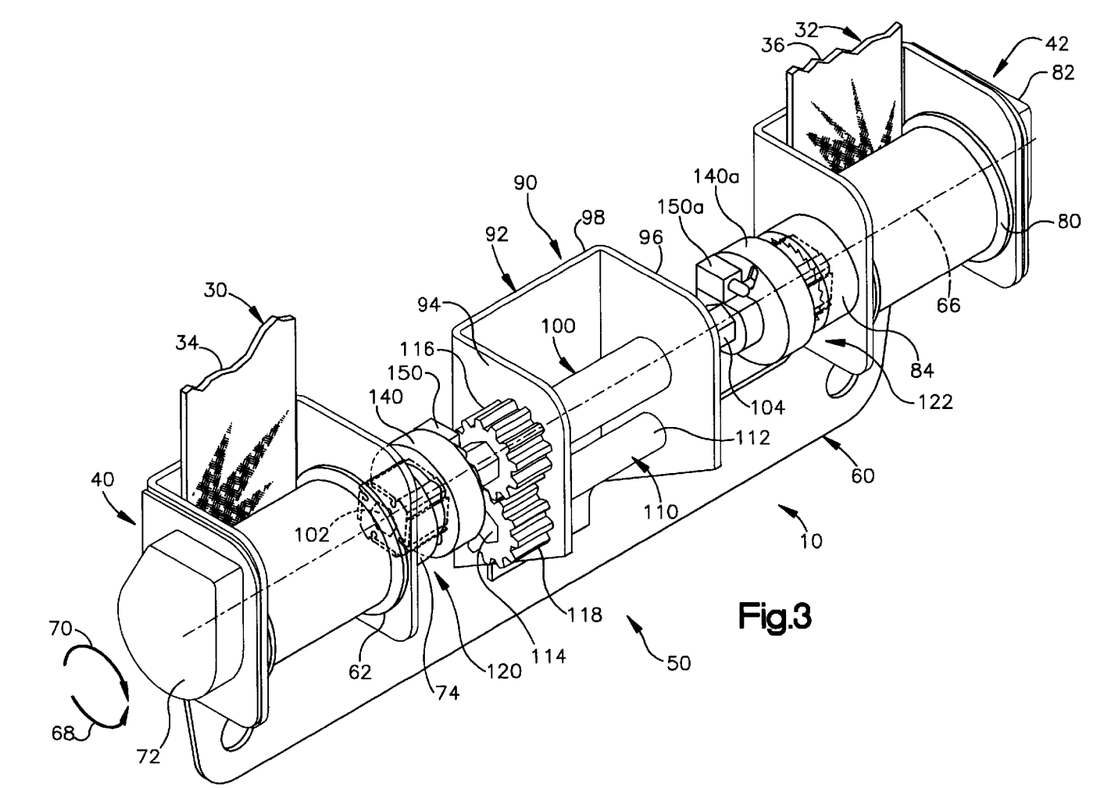
FIG. 3 is a perspective view of the shoulder belt retractor assembly of FIG. 2.

The shoulder belt retractor assembly 50 (FIGS. 3–5) includes a base 60 that is preferably a sheet metal stamping. At one end of the base 60, the left shoulder belt retractor 40 is supported on the base. The left retractor 40 includes a spool 62 supported on the base 60 for rotation relative to the base about an axis 66. The spool 62 is rotatable in a belt retraction direction 68 and an opposite belt withdrawal direction 70. The end portion 34 of the left shoulder belt 30 is wound on the spool 62. A rewind spring assembly 72 biases the spool 62 for rotation in the belt retraction direction 68.

The left spool 62 has an internal ratchet 74 (FIG. 4) that is presented toward the right retractor 42. The ratchet 74 includes a circular array of ratchet teeth 76 oriented to engage one or more pawls 134 (described below) to block rotation of the spool 62 in the belt withdrawal direction 70.

At the other end of the base 60, the right shoulder belt retractor 42 is supported on the base. The right retractor 42 is identical to the left retractor 40. The right retractor 42 includes a spool 80 supported on the base 60 for rotation relative to the base about the axis 66 in the belt retraction direction 68 and the belt withdrawal direction 70. The end portion 36 of the right shoulder belt 32 is wound on the spool 80. A rewind spring assembly 82 biases the spool 80 for rotation in the belt retraction direction 68.

The right spool 80 has an internal ratchet 74a that is presented toward the left retractor 40. The ratchet 74a includes a circular array of ratchet teeth that are oriented to engage one or more pawls 134a to block rotation of the spool 80 in the belt withdrawal direction 70.

The seat belt system 10 includes, as part of the shoulder belt retractor assembly 50, a central energy management unit or load limiter 90. The load limiter 90 is supported on the base 60 between the left and right retractors 40 and 42. The load limiter 90 drivingly interconnects the left retractor 40 with the right retractor 42. The load limiter 90 is operable, as described below, to limit the load experienced by the vehicle occupant due to the left and/or right shoulder belts 30 and 32, in the event of a vehicle collision. The load limiter 90 also functions as a locking mechanism for the left and right retractors 40 and 42.

The load limiter 90 includes a generally U-shaped load limiter support 92 fixed on the base 60. The U-shaped configuration of the load limiter support 92 includes left and right side walls 94 and 96 and a back wall 98.

The load limiter 90 also includes a shaft 100 that is coaxial with the spools 62 and 80. The shaft 100 does not rotate during normal driving operation of the vehicle, but only in the event of a vehicle collision or similar occurrence for which the load limiting function of the retractor assembly 50 is called into play. In such a case, as described below, the shaft 100 selectively transmits torque from the left retractor 40, or the right retractor 42, or both, to the load limiter 90.

In the illustrated embodiment, the shaft 100 is a solid metal rod having a cross-sectional configuration centered on the axis 66. The shaft 100 extends through openings in the left and right side walls 94 and 96 of the load limiter support 92. A hexagonal left end portion 102 of the shaft 100 is located radially inward of the ratchet 74 of the left spool 62. A hexagonal right end portion 104 of the shaft 100 is located radially inward of the ratchet 84 of the right spool 80.

The load limiter 90 includes a load limiting device in the form of a deformable member, for limiting load experienced by the vehicle occupant 12 through the left and right shoulder belts 30 and 32 in a vehicle collision. In the illustrated embodiment, the deformable member is a metal torsion bar 110. The torsion bar 110 is supported on the load limiter support 92, extending parallel to the shaft 100.

The torsion bar 110 has an elongate, cylindrical configuration. A first end portion 112 of the torsion bar 110 is fixed in the right side wall 96 of the load limiter support 92, so that the first end portion can not rotate relative to the load limiter support. A second end portion 114 of the torsion bar 110 is located outwardly of the left side wall 94 of the load limiter support 92, and is rotatable relative to the load limiter support 92. The torsion bar 110 is made from a ductile metal that enables the second end portion 114 of the torsion bar to be twisted up to five or six complete revolutions, relative to the first end portion 112, without breaking.

The load limiter 90 includes a first spur gear 116 fixed to the shaft 110 for rotation with the shaft. The load limiter 90 includes a second spur gear 118 fixed for rotation with the second end portion 114 of the torsion bar 110. The second spur gear 118 is in meshing engagement with the first spur gear 116 on the shaft. As a result, the first and second spur gears 116 and 118 are operable to transmit rotational force between the shaft 100 and the torsion bar 110, as described below.

The load limiter 90 includes left and right one-way clutches 120 and 122 associated with the left and right retractors 40 and 42, respectively. The clutches 120 and 122 are selectively actuatable to transmit torque in the belt withdrawal direction 70 from their associated retractors 40 and 42, respectively, to the shaft 100. The left clutch 120 is described below in detail. The right clutch 122 is a mirror image of the left clutch and so is described only briefly below, using similar reference numerals with the suffix "a" added.

The left clutch 120 includes a hub 130. The hub 130 is supported on the left end portion 102 of the shaft 100 for rotation with the shaft. The hub 130 has at least one pocket 132 (FIG. 7) on its outer periphery. In the illustrated embodiment, the hub 130 is a molded plastic. member including a plurality of pockets, specifically, four pockets 132.

The clutch 120 also includes at least one pawl or latch 134. In the illustrated embodiment, the clutch 120 includes a plurality of pawls, specifically, four pawls 134. The pawls 134 are supported on the periphery of the hub 130 for pivotal movement relative to the hub. Each one of the pawls 134 has an outer end or tip 136.

Figure 7:
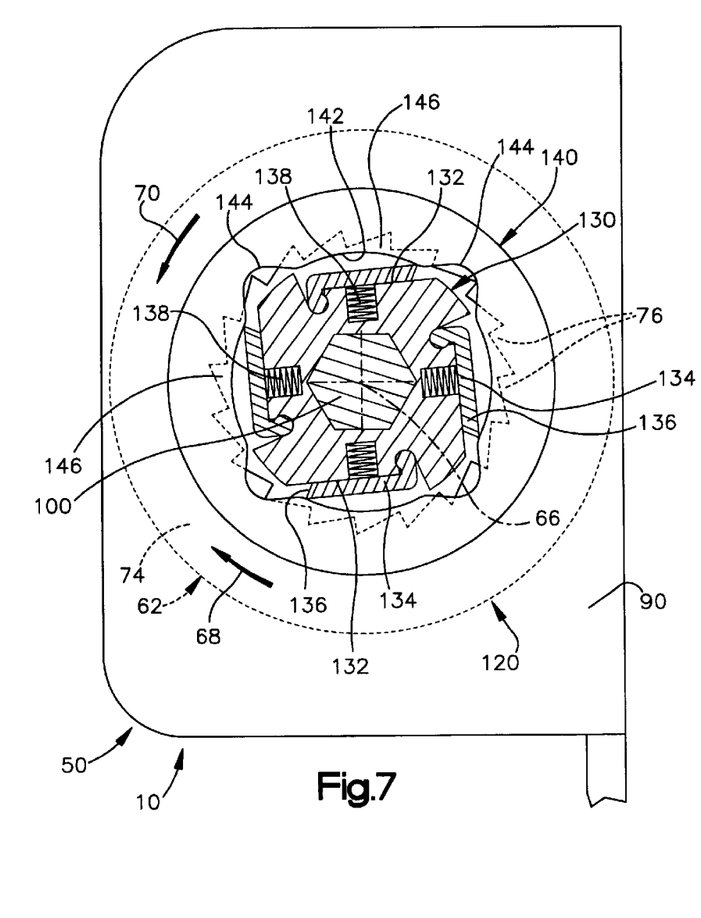
FIG. 7 is a schematic sectional view of a clutch that forms part of the shoulder belt retractor assembly of FIG. 2, shown in a first or unlocked condition.

The pawls 134 have an unactuated condition, as shown in FIG. 7, in which the pawl tips 136 are disposed radially inward in the pockets 132 in the hub 130. When the pawls 134 are in the unactuated condition, the pawl tips 136 describe a circle having a diameter that is less than the inner diameter of the array of ratchet teeth 76 on the spool ratchet 74. Therefore, the pawl tips 136 are located radially inward of the ratchet teeth 76 on the spool ratchet 74, and the ratchet 74 can rotate about the hub 130 without engaging the pawls 134.

Figure 9:
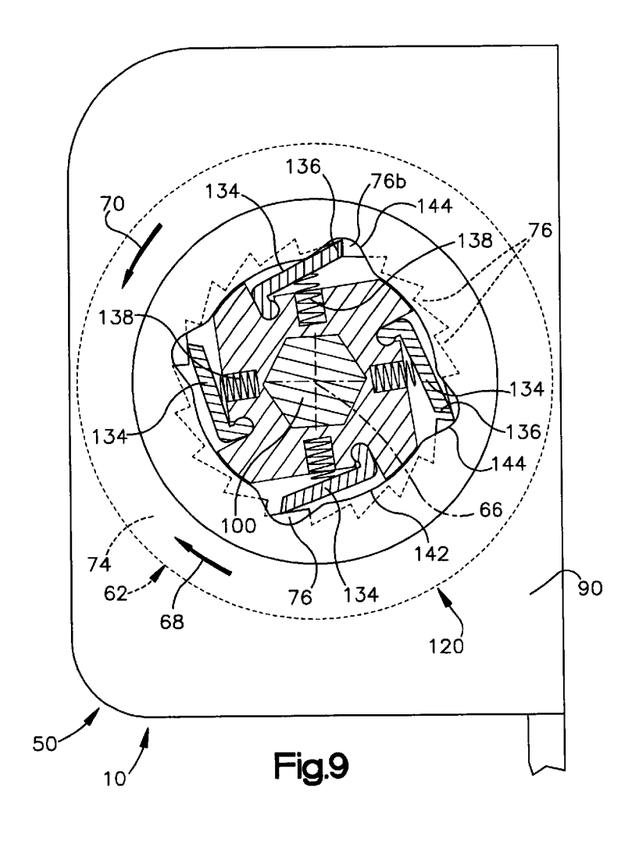
FIG. 9 is a view similar to FIG. 7 showing the clutch of FIG. 7 in a second or locked condition.

The left clutch 120 also includes at least one spring 138. In the illustrated embodiment, the clutch 120 includes a plurality of springs 138, specifically, four springs, associated one with each pawl 134. The springs 138 are supported on the hub 130, beneath the pawls 134. The springs 138 bias the pawls 134 radially outward into an actuated condition as shown in FIG. 9.

When the pawls 134 are in the actuated condition, the pawl tips 136 extend out of the pockets 132 and are located radially outward of the outer periphery of the hub 130. When the pawls 134 are in the actuated condition, as shown in FIG. 9, the pawl tips 136 describe a circle having a diameter greater than the inner diameter of the array of ratchet teeth 76 on the spool ratchet 74. Therefore, the pawl tips 136 are engageable with the ratchet teeth 76 on the spool ratchet 74, in a manner described below.

The pawls 134 are spaced about the periphery of the hub 130 so that only one pawl is in engagement with the ratchet teeth 76 at any one time. The spacing of the pawls 134 about the periphery of the hub is designed to minimize the amount of relative rotation required between the pawls 134 and the ratchet 74 before one of the pawls engages the ratchet teeth 76. For example, the illustrated clutch 120 (FIG. 9) includes nineteen ratchet teeth 76 spaced apart equally about the axis 66, and four pawls 134 spaced apart equally about the axis 66. As a result, no more than about five degrees of rotation of the ratchet 74 is needed before one of the pawls 134 snaps into a locking position with the ratchet teeth 76.

Figure 4:
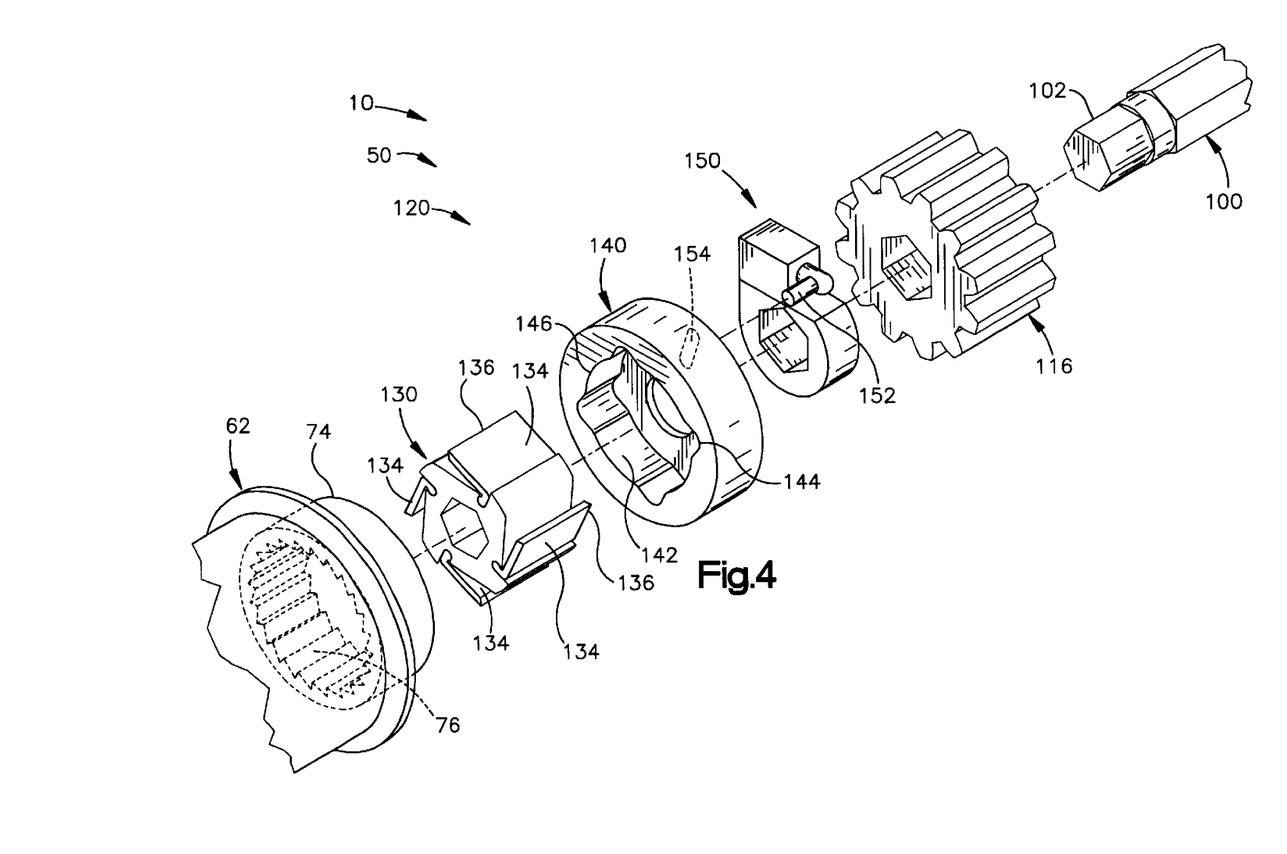
FIG. 4 is an exploded perspective view of parts of the shoulder belt retractor assembly of FIG. 2.
Figure 5:
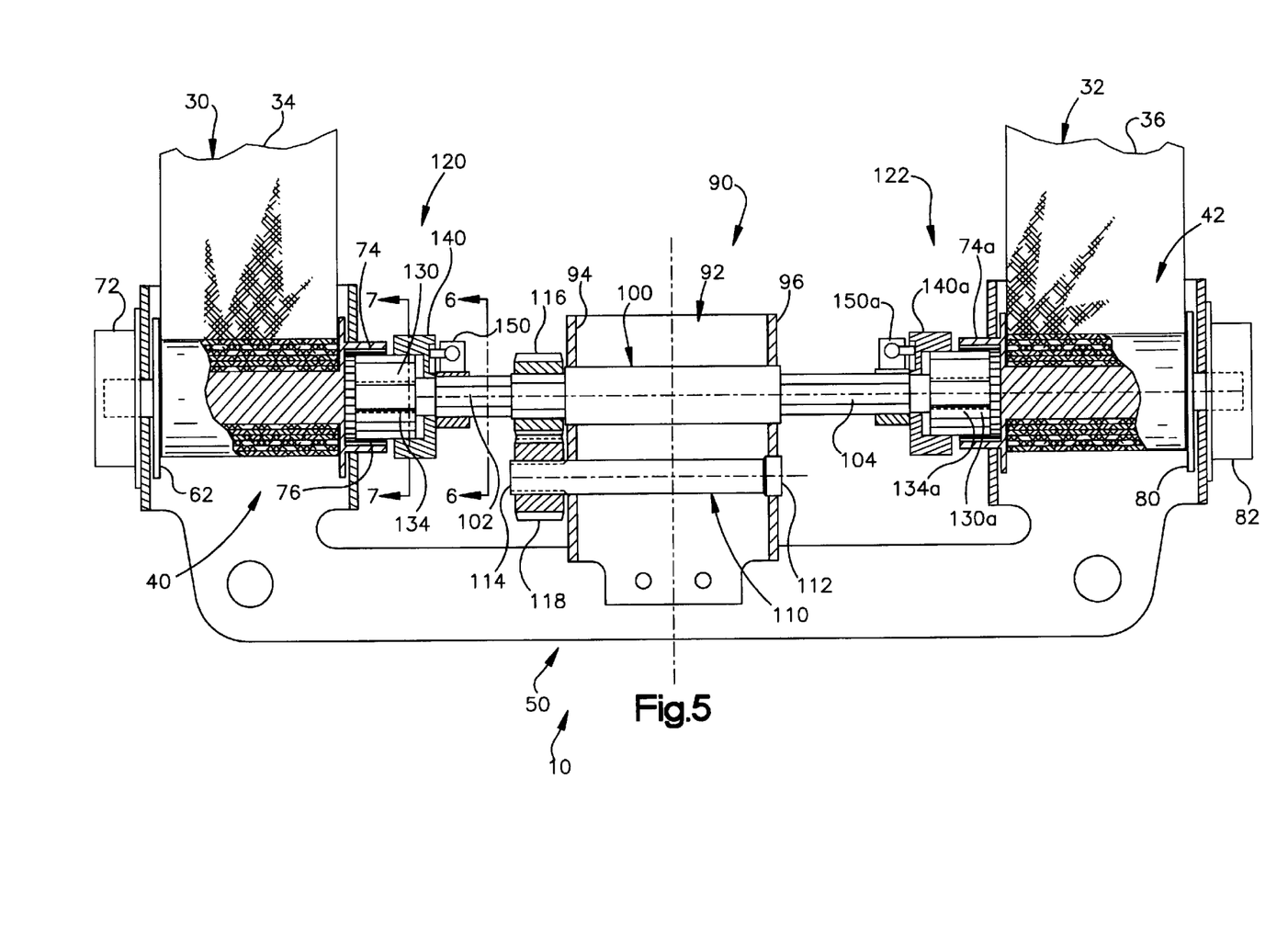
FIG. 5 is a schematic view of the shoulder belt retractor assembly of FIG. 2.

The clutch 120 includes a sleeve 140 (FIG. 4). The sleeve 140 is supported on the shaft 100 for rotation relative to the shaft. The sleeve 120 is located axially inward (toward the right retractor 42) of the spool ratchet 74.

The sleeve 140 has a generally cylindrical configuration with a cylindrical inner surface 142. The inner surface 142 is relieved at four locations by axially extending grooves 144 that define between them four lands 146 of the sleeve. The grooves 144 and the lands 146 are all spaced apart equally in an array about the axis 66.

The cylindrical inner surface 142 of the sleeve 140 has a diameter that is less than the inner diameter of the spool ratchet 74, but greater than the outer diameter of the hub. The grooves 144 provide openings or spaces in the sleeve 140 that are farther from the axis 66 than the lands 146. The grooves 144 can receive the pawl tips 136 in a manner described below.

The sleeve 140 is rotatable between first and second positions of rotation (FIGS. 6 and 8) about the axis 66. The shoulder belt retractor assembly 50 includes an actuation mechanism for thus rotating the sleeve 140. In the illustrated embodiment, the actuation mechanism is a double-acting solenoid shown schematically at 150. The solenoid 150 is mounted on the shaft 100 for rotation with the shaft. The solenoid 150 has a movable pin 152 received in an angled slot 154 in the sleeve 140. The solenoid 150 is electrically connected at 158 (FIG. 1) to the controller 58.

Figure 6:
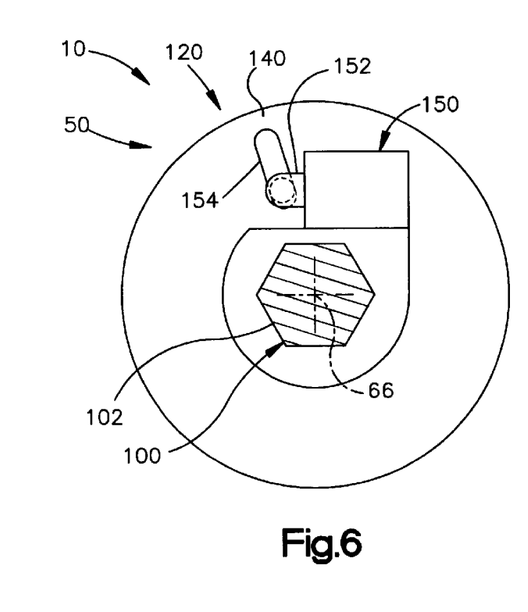
FIG. 6 is schematic view of a solenoid assembly that forms part of the shoulder belt retractor assembly of FIG. 2, shown in a first condition.
Figure 8:
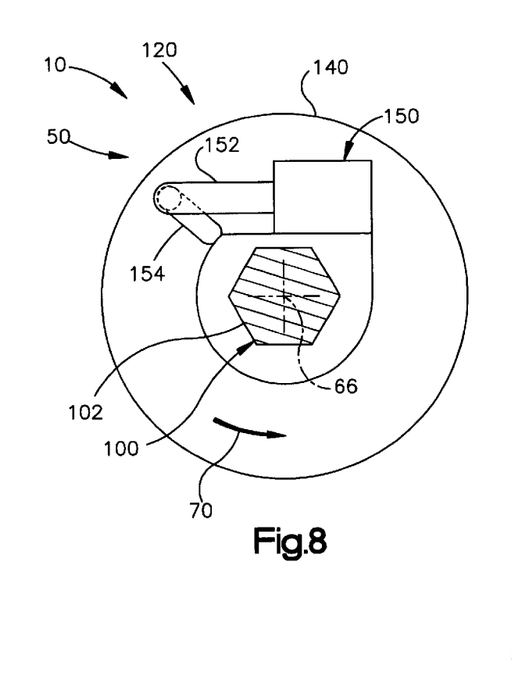
FIG. 8 is a view similar to FIG. 6 showing the solenoid assembly of FIG. 6 in a second condition.

When the solenoid 150 is in a first condition of actuation, as illustrated in FIGS. 6 and 7, the sleeve 140 is in the first position of rotation relative to the shaft 100, and thus the hub 130. When the solenoid 150 is in a second condition of actuation as shown in FIGS. 8 and 9, the sleeve 140 is rotated to its second position of rotation relative to the shaft 100 and hub 130.

When the sleeve 140 is rotated in either direction by the solenoid 150, the grooves 144 and lands 146 of the sleeve move relative to the hub 130 and the pawls 134. As a result, the sleeve 140 when it rotates about the shaft 100 is capable of controlling the radial position of the pawl tips 136 relative to the hub 130 and the axis 66.

A first portion of the hub 130 and pawls 134 (FIG. 5) is disposed radially inward of the spool ratchet 74. A second portion of the hub 130 and pawls 134 is disposed radially inward of the sleeve 140. Because (a) the pawls 134 are located inward of the both the sleeve 140 and the ratchet 74, and because (b) rotation of the sleeve about the shaft 100 controls the radial position of the pawl tips 136, then (c) rotation of the sleeve about the shaft controls the radial position of the pawl tips relative to the ratchet teeth 76 on the spool 70.

Specifically, when the sleeve 140 is in its first position of rotation about the shaft 100, as illustrated in FIGS. 6 and 7, the sleeve lands 146 are positioned radially outward of the pawl tips 136. The sleeve lands 146 hold the pawls 134 inward and in the hub pockets 132, against the bias of the springs 138.

When the sleeve 140 is in its second position of rotation about the shaft 100, as illustrated in FIGS. 8 and 9, the grooves 144 in the sleeve are positioned radially outward of the pawl tips 136. The springs 138 therefore can bias the pawls 134 radially outward into the grooves 144 in the sleeve 140.

The right clutch 122 operates in the same manner as the left clutch 120. The right clutch 122 includes a hub 130a (FIG. 5) secured for rotation with the right end portion 104 of the shaft 100. The hub 130a supports a plurality of pawls 134a. The pawls 134a are biased outwardly by springs. The clutch 122 includes a rotatable sleeve 140a that is located radially outside the pawls 134a. A solenoid 150a in one condition rotates the sleeve 140a to a position in which it holds the pawls 134a inward, away from the right ratchet 74a. In its other condition of actuation, the solenoid 150a rotates the sleeve 140a to a position in which the pawls 134a spring radially outward to engage the array of ratchet teeth 76a on the right spool 80.

The left clutch 120 has a first condition of operation (FIGS. 6 and 7), when it is not actuated, in which it does not transmit torque (load) in either direction between the left retractor spool 62 and the shaft 100. When the left clutch 120 is in the first condition, the left retractor spool 62 is uncoupled from the shaft 100, so that the left retractor operates independently of the load limiter 90.

Specifically, during normal driving operation of the vehicle, the solenoid 150 is not actuated (or is in a first condition of actuation). As a result, the sleeve 140 of the left clutch 120 is in the first position of rotation relative to the hub 130 and pawls 134. The lands 146 on the sleeve 140 hold the pawls 134 radially inward, away from the ratchet teeth 76 on the left retractor spool 62. The spool 62 is, therefore, rotatable relative to the shaft 100 and the base 50, in either the belt retraction direction 68 or the belt withdrawal direction 70, without engaging the pawls 134. Thus, the load limiter 90 does not resist rotation of the spool 62.

The left clutch 120 is in this first condition of operation during normal usage of the seat belt system 10, that is, when the controller 58 does not determine that there exists a condition requiring locking of the retractors 40 and 42. In this usage condition, the left and right clutches 120 and 122 are unactuated. The retractor spools 40 and 42 are rotatable in the belt withdrawal direction 70 under the influence of tensile forces applied to the shoulder belts 30 and 32, and in the belt retraction direction 68 under the influence of forces applied by the rewind spring assemblies 72 and 82.

The unactuated condition and operation of the right clutch 122 is similar. When the right clutch 122 is not actuated, it does not transmit torque (load) in either direction between the right retractor spool 80 and the shaft 100. The right retractor spool 80 is uncoupled from the shaft 100, so that the right retractor 42 operates independently of the load limiter 90.

If the controller 58 determines that the shoulder belt retractors 40 and 42 should be locked to prevent belt webbing withdrawal, the clutches 120 and 122 are actuated. For example, if sudden vehicle deceleration indicative of a crash condition is sensed, the controller 58 sends an actuation signal simultaneously to the left clutch 120 and to the right clutch 122. The operation of the left clutch 120 when actuated is described below in detail. The operation of the right clutch 122, which is similar, is described below only briefly.

When the left clutch 120 is actuated (FIGS. 8 and 9), the solenoid 150 is actuated to rotate the left sleeve 140 from the first position of rotation to the second position of rotation about the shaft 100. As the sleeve 140 rotates, the lands 146 on the sleeve move off the pawls 134 on the hub 130. The biasing force of the springs 138 causes the pawls 134 to spring outward so that one of the pawl tips 136 engages the array of ratchet teeth 76. In this actuated condition, the left clutch 120 is in a condition to transmit load, or torque, from the left spool 62 to the shaft 100, upon rotation of the left spool in the belt withdrawal direction of rotation 70. Specifically, if a load applied by the vehicle occupant 12 causes belt webbing 30 to be withdrawn from the left retractor spool 62, the spool rotates, and the ratchet 74 rotates as part of the spool, in a counter-clockwise direction as viewed in FIGS. 7 and 9. The ratchet 74 rotates only until one of the ratchet teeth 76 lockingly engages one of the pawl tips 136 in a manner that can transmit rotational force. For example, as shown in FIG. 9, the pawl tip 136 of the uppermost pawl 134 is lockingly engaged with the ratchet tooth 76b in a manner, so that rotation of the ratchet 74 in the counter-clockwise direction transmits rotational force from the ratchet to the pawl.

The load from the rotating spool 62 is transferred into the pawl 134, the hub 130, and the shaft 100. The spur gears 116 and 118 transfer the load from the shaft 100 to the second end portion 114 of the torsion bar 110. Because the first end portion 112 of the torsion bar 110 is fixed against rotation, the inherent resistance to deformation of the torsion bar resists rotation of the shaft 100.

The torsion bar 110 is designed to twist under a predetermined load, typically about 1500 pounds. If this predetermined load is not exceeded, as it normally would not be, then the torsion bar 110 does not twist. The shaft 100 cannot rotate, the spool 62 is prevented from further rotation, and withdrawal of belt webbing 30 ceases. The retractor 40 is in a "locked" condition.

When the left clutch 120 is thus actuated, it can not transmit load from the spool 62 into the shaft 100, in the opposite belt retraction direction of rotation 68. Whenever the left spool 62 does rotate in the belt retraction direction 68 (clockwise as viewed in FIG. 9), under the influence of the rewind spring assembly 72, ratcheting action occurs as the teeth 76 move over the pawl tips 136. The pawls 134 do not provide any significant resistance to rotation of the spool 62. Therefore, the spool 62 remains rotatable in a normal manner in the belt retraction direction 68 when the left clutch 120 is actuated.

In addition, because the left clutch 120 is a one-way clutch, the left clutch when actuated can not transmit torque from the shaft 100 into the spool 62 in the belt withdrawal direction of rotation 70. If the shaft 100 does rotate in the belt withdrawal direction 70 (counterclockwise as viewed in FIG. 9) under the influence of force applied not from the spool 62, ratcheting action occurs as the pawl tips 136 move past the ratchet teeth 76. The rotation of the shaft 100 in the belt withdrawal direction 70 does not transfer any significant load, through the pawls 134, to the retractor spool 62, in the belt withdrawal direction.

When the left clutch 120 is actuated as described above to block withdrawal of belt webbing 30 from the left retractor 40, the right clutch 122 is actuated at the same time. Therefore, the right retractor spool 80 is locked at the same time the left retractor spool 62 is locked. Any attempt to withdraw additional belt webbing 32 transmits load through the right clutch 122 into the shaft 100 and thereby into the torsion bar 110. The torsion bar 110 resists twisting unless and until the predetermined load is exceeded. As is the case with the left spool 62, the right spool 80 remains rotatable in the belt retraction direction 68, and the right spool cannot transmit load into the shaft 100 in the belt retraction direction of rotation.

Because neither the left clutch 120 nor the right clutch 122 can transmit load into the shaft 100, in the belt retraction direction 68 (clockwise as viewed in FIGS. 7 and 9), neither spool 62 or 80 can cause the shaft to rotate in the belt retraction direction. Therefore, the shaft 100 is never driven for rotation in the belt retraction direction 68. Because the shaft 100 does not rotate in the belt retraction direction 68, no load is transmitted from the shaft 100 into the left and right spools 62 and 80, in the belt retraction direction.

In summary, each of the left and right clutches 120 and 122 is a one-way clutch that when unactuated uncouples its associated retractor 40, 42 from the load limiter 90. The clutches 120, 122 when actuated couple the shaft 100 for rotation, in response to rotation of the retractor spools 62, 80, only in the belt withdrawal direction 70 and only in response to force levels exceeding the predetermined amount.

In the event of a vehicle collision or impact of some type, the occupant 12 of the seat 14 may transmit load into one or both of the shoulder belts 30 and 32, in an amount in excess of the predetermined amount. If this occurs when the retractors 40 and 42 are locked, that load is transmitted through the locked retractors into the shaft 100 in the manner described above.

Assuming that both shoulder belts 30 and 32 are loaded equally, the left and right clutches 120 and 122 transmit equal loads into the shaft 100, attempting to rotate the shaft in the belt withdrawal direction 70. The combined load is transmitted from the shaft 100, through the spur gears 116 and 118, into the second end portion 114 of the torsion bar 110.

Because the first end portion 112 of the torsion bar 110 is blocked from rotation, and the load on the shaft 100 exceeds the predetermined amount, the torsion bar 110 deforms plastically by twisting of the second end portion 114 relative to the first end portion 112. When the second end portion 114 of the torsion bar 110 turns, the spur gears 116 and 118 are freed for rotation, allowing the shaft 100 to rotate also, in the belt withdrawal direction 70.

Until the shaft 100 rotates, the hubs 130, 130a hold the pawls 134, 134a in place to block rotation of the spools 62, 80 in the belt withdrawal direction 70. When the shaft 100 is freed to rotate in the belt withdrawal direction 70, however, the left and right hubs 130, 130a are also freed to rotate in the belt withdrawal direction (counterclockwise as viewed in FIG. 9). This allows the spools 62, 80 to rotate in the belt withdrawal direction 70 under the influence of tensile force applied to the spools from the lengths of belt webbing 30 and 32. A small amount of belt webbing is unwound from each one of the spools 62, 80. The occupant's forward movement against the shoulder belts 30 and 32 is restrained at a reduced rate over an increased period of time, helping to reduce the maximum load experienced by the vehicle occupant 12.

It may happen that only one of the two spools 62, 80 is loaded when the retractors 40, 42 are locked, rather than both spools being loaded. For example, in a side impact collision, the occupant 12 may twist in the seat 14, causing the occupant's left shoulder to move forward, and the right shoulder to remain against the vehicle seatback 18.

If this type of occupant movement occurs, all or substantially all the load from the vehicle occupant is transmitted into the load limiter 90 through the left clutch 120 and the left retractor 40. If this load exceeds the predetermined amount, the torsion bar 110 twists. The twisting of the torsion bar 110 allows the shaft 100 to rotate in the belt withdrawal direction 70. This rotation allows the left retractor spool 62 to rotate in the belt withdrawal direction 70, under the influence of the tensile force being applied to the spool 62 by the length of belt webbing 30. A small amount of belt webbing 30 is unwound from the left spool 62, helping to reduce maximum load experienced by the vehicle occupant 12 due to the left shoulder moving forward in the vehicle relative to the vehicle seat back 18.

When the shaft 100 rotates in this way, by forces applied from the left spool 62, the shaft rotation is transmitted to the right clutch 122. If the right clutch 122 were not a one-way clutch, it could transmit the rotational force of the shaft 100 into the right retractor spool 80, driving the right spool to rotate in the belt withdrawal direction 60 and undesirably causing belt webbing 32 to be paid out from the right retractor 42.

Figure 10:
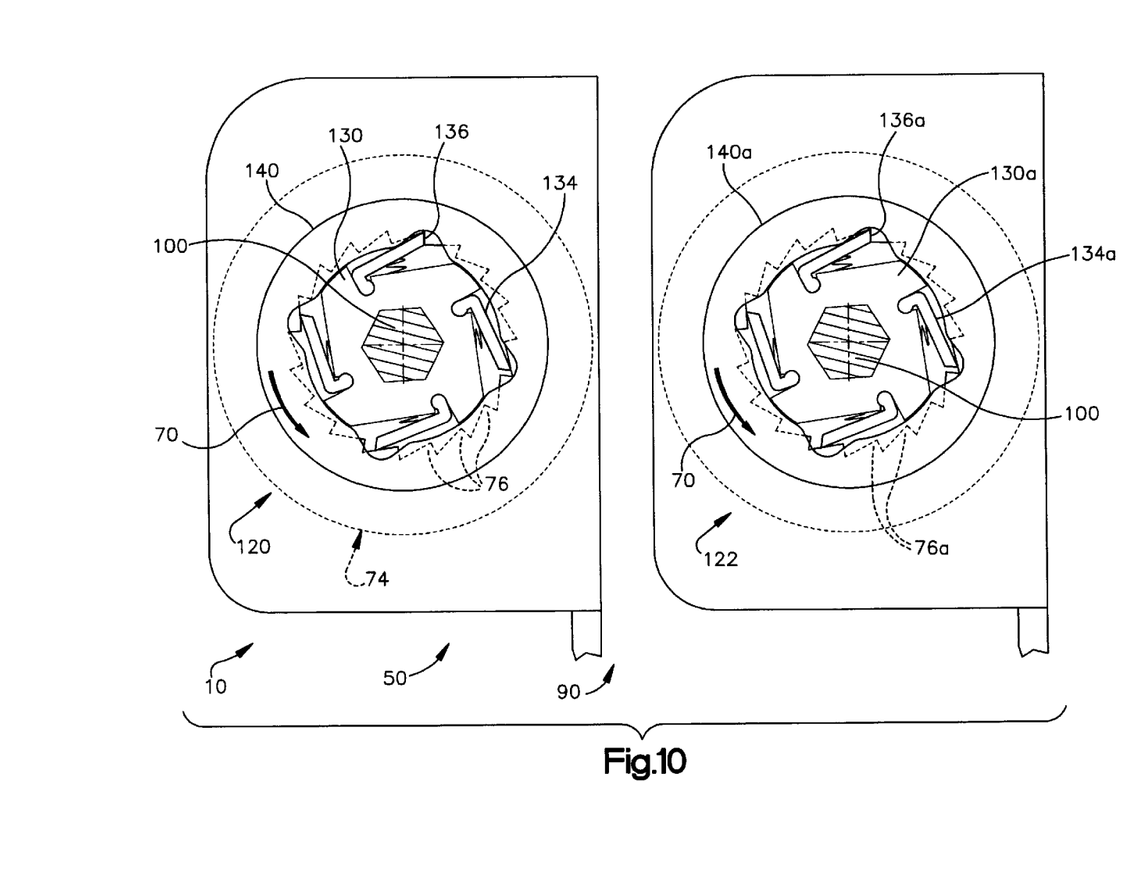
FIG. 10 shows the clutch of FIG. 7, and an associated clutch, both in an actuated condition.

Because the right clutch 122 (FIG. 10) is a one-way clutch, however, the orientation of its pawls 134a relative to the right ratchet 74a causes the pawls to slip past the ratchet teeth on the right spool 80, when the shaft 100 rotates the right hub 130a in the belt withdrawal direction 70. (FIG. 10 shows both clutches 120 and 122 in the actuated condition.) As a result, the rotation of the shaft 100 and the right hub 130a in the belt withdrawal direction 70, caused by high load applied to only the left retractor 40, does not transfer any significant load into the right retractor spool 80. The right retractor spool 80 is not driven to rotate in the belt withdrawal direction 70, and belt webbing 32 is not paid out. The right shoulder of the vehicle occupant 12 is maintained in position against the vehicle seat back 18 by the locked right retractor 42. If the left and right spools 62 and 80 are both loaded but in unequal amounts, and in a combined amount exceeding the predetermined amount, the load is transmitted through the left and right clutches 120 and 122 into the torsion bar 110, and the torsion bar twists. The twisting of the torsion bar 110 frees the shaft 100 to rotate in the belt withdrawal direction 70. This allows the left and right spools 62 and 80 to rotate in the belt withdrawal direction 70 under the influence of tensile forces applied by their associated lengths of belt webbing 30, 32.

Because the retractor spools 62 and 80 rotate in the belt withdrawal direction 70 only because of forces applied by the belt webbing 30, 32, and are not driven to rotate by the shaft 100, the one retractor spool 62 or 80 that is experiencing greater load from its associated belt webbing 30 or 32 rotates faster. The rotation of that spool 62 or 80 effectively drives the shaft 100 for rotation in the belt withdrawal direction 70. At the opposite end of the shaft 100, the other spool 62 or 80 rotates more slowly in the belt withdrawal direction 70, with some ratcheting action occurring as belt webbing 30 or 32 is paid out at a lower rate under the influence only of force applied to the belt webbing.

From the above description of the invention, those skilled in the art will perceive improvements, changes and modifications in the invention. Such improvements, changes and modifications within the skill of the art are intended to be covered by the appended claims.

I claim:

1. Apparatus for helping to protect a vehicle occupant in a vehicle seat, comprising:

a first length of belt webbing for extending over a vehicle occupant and a second length of belt webbing for extending over the vehicle occupant;

a first spool supported for rotation in a belt retraction direction and an opposite belt withdrawal direction, a portion of said first length of belt webbing being wound on said first spool;

a second spool supported for rotation in a belt retraction direction and an opposite belt withdrawal direction, a portion of said second length of belt webbing being wound on said second spool; and a mechanism for blocking rotation of said first and second spools in the belt withdrawal direction until a predetermined force is applied to said first and second spools and for permitting rotation of said first and second spools in the belt withdrawal direction when a force above said predetermined force is applied to said first and second spools;

said mechanism drivingly interconnecting said first and second spools and permitting rotation of one of said first and second spools in the belt withdrawal direction after blocking rotation in the belt withdrawal direction without causing rotation of the other spool in the belt withdrawal direction.

2. Apparatus as set forth in claim 1 wherein said mechanism includes a member that deforms when a force above said predetermined force is applied to said first and second spools.

3. Apparatus as set forth in claim 2 wherein said member is a torsion bar.

4. Apparatus as set forth in claim 1 wherein said mechanism includes a load limiter for reducing the maximum load experienced by the vehicle occupant through said first and second lengths of belt webbing.

5. Apparatus as set forth in claim 4 wherein said mechanism includes a first actuatable one way clutch connected between said first spool and said load limiter and a second actuatable one way clutch connected between said second spool and said load limiter.

6. Apparatus as set forth in claim 5 wherein said load limiter is uncoupled from said first spool when said first one way clutch is unactuated thereby enabling rotation of said first spool in the belt withdrawal direction and in the belt retraction direction, and said load limiter is coupled to said first spool when said first one way clutch is actuated to block rotation of said first spool in the belt withdrawal direction while enabling rotation of said first spool in the belt retraction direction.

7. Apparatus as set forth in claim 1 wherein said mechanism includes a rotatable shaft extending between said first and second spools, said shaft rotating with said first spool in the belt withdrawal direction under the influence of tensile forces applied to said first length of belt webbing in excess of the predetermined force, said mechanism including means for blocking rotation of said second spool in the belt withdrawal direction in response to rotation of said shaft in the belt withdrawal direction.

8. Apparatus as set forth in claim 1 wherein said mechanism includes a deformable member and a rotatable shaft for transmitting rotational force from said first and second spools into said deformable member, said first and second clutches blocking transmission of rotational force from said shaft into said spools.

9. Apparatus as set forth in claim 8 wherein said deformable member comprises a torsion bar having a first end portion rotatable relative to a second end portion in response to force in an amount exceeding a predetermined amount.

10. Apparatus for helping to protect a vehicle occupant in a vehicle seat, comprising:

a first length of belt webbing for extending over a vehicle occupant and a second length of belt webbing for extending over the vehicle occupant;

a first spool supported for rotation in a belt retraction direction and an opposite belt withdrawal direction, a portion of said first length of belt webbing being wound on said first spool;

a second spool supported for rotation in a belt retraction direction and an opposite belt withdrawal direction, a portion of said second length of belt webbing being wound on said second spool;

a load limiter for reducing the maximum load experienced by the vehicle occupant through said first and second lengths of belt webbing;

a first actuatable one way clutch connected between said first spool and said load limiter; and a second actuatable one way clutch connected between said second spool and said load limiter.

11. Apparatus as set forth in claim 10 wherein said first one way clutch and said second one way clutch are actuatable to block rotation of said first and second spools in the belt withdrawal direction.

12. Apparatus as set forth in claim 11 wherein said load limiter and said first and second one way clutches when actuated drivingly interconnect said first and second spools and permit rotation of one of said first and second spools in the belt withdrawal direction after blocking rotation in the belt withdrawal direction without causing rotation of the other one of said first and second spools in the belt withdrawal direction.

13. Apparatus as set forth in claim 10 wherein:
said load limiter is uncoupled from said first spool when said first one way clutch is unactuated thereby enabling rotation of said first spool in the belt withdrawal direction and in the belt retraction direction; and said load limiter is coupled to said first spool when said first one way clutch is actuated to block rotation of said first spool in the belt withdrawal direction while enabling rotation of said first spool in the belt retraction direction.

14. Apparatus as set forth in claim 13 wherein said load limiter includes a member rotatable by said first spool in the belt withdrawal direction upon the application of tensile force from said first length of belt webbing to said first spool in an amount exceeding a predetermined amount when said first one way clutch is actuated, said member being rotatable by said second spool in the belt withdrawal direction upon the application of tensile force from said second length of belt webbing to said second spool in an amount exceeding the predetermined amount when said second one way clutch is actuated.

15. Apparatus as set forth in claim 10 wherein said first one-way clutch when actuated is operable to transmit rotational force from said first spool to said load limiter but not to transmit rotational force from said load limiter to said first spool.

16. Apparatus as set forth in claim 10 wherein said load limiter includes a deformable member and a rotatable shaft for transmitting rotational force from said first and second spools into said deformable member, said first and second clutches transmitting rotational force from said spools into said shaft and for blocking transmission of rotational force from said shaft into said spools.

17. Apparatus as set forth in claim 16 wherein said deformable member comprises a torsion bar having a first end portion rotatable relative to a second end portion in response to force in an amount exceeding a predetermined amount.

18. Apparatus as set forth in claim 10 wherein each one of said first and second one way clutches is actuatable from a first condition uncoupling said spools from said load limited to a second condition coupling said spools to said load limiter to block rotation of said spools in the belt withdrawal direction, and each one of said first and second one way clutches is thereafter actuatable from the second condition coupling said spools to said load limiter to the first condition uncoupling said spools from said load limiter.

19. Apparatus as set forth in claim 18 wherein said load limiter includes a deformable member deformable in response to tensile force on one or both of said first and second spools in an amount exceeding a predetermined amount when said first and second clutches are in the second condition coupling said spools to said load limiter to block rotation of said spools in the belt withdrawal direction.

* * * * *